Feb. 5, 1952     F. W. GAY     2,584,573

METHOD AND MEANS FOR HOUSE HEATING

Filed Jan. 31, 1950     2 SHEETS—SHEET 1

INVENTOR.
Frazer W. Gay
BY George D. Richards
Attorney

Patented Feb. 5, 1952

2,584,573

UNITED STATES PATENT OFFICE 2,584,573

METHOD AND MEANS FOR HOUSE HEATING

Frazer W. Gay, Metuchen, N. J.

Application January 31, 1950, Serial No. 141,546

11 Claims. (Cl. 257—9)

This invention relates to a novel method and means for house heating by means of a heat pump.

House heating by means of a heat pump operative to pump heat from outdoor air into the house is known to the art, and can be effectively carried on except in very cold weather. House heating by heat pump operation can be improved by the provision of means for storing a reserve of heat in the ground under the house, which reserve heat can be drawn upon for heat pump operation in very cold weather, but even then efficiency of operation is diminished by reason of the fact that the relatively small area of ground beneath the house, which is usable for heat storage, cannot long supply a sufficient amount of heat to maintain heat pump operation during a prolonged spell of very cold winter weather.

Having the above in view, it is an object of this invention to increase the efficiency of house heating by heat pump, with respect to operation during a prolonged spell of very cold winter weather, by providing improved means for storing heat in the earth or ground beneath the house, and by providing means for continuously pumping heat to the storage means by operation of the heat pump in moderate winter weather, and by using the stored heat as a source of heat supply to the pump in very cold winter weather, and to this end to transfer heat to ground storage from hot condensed refrigerant liquid, as such liquid flows from the condenser of the heat pump back to the evaporator thereof.

This invention has for a further object to additionally provide means for supplying solar heat to the ground storage means, whereby to increase the amount of stored heat available for heat pump operation in very cold winter weather.

Other objects of this invention, not at this time more particularly enumerated, will be understood from the following detailed description of the same.

Figure 1:
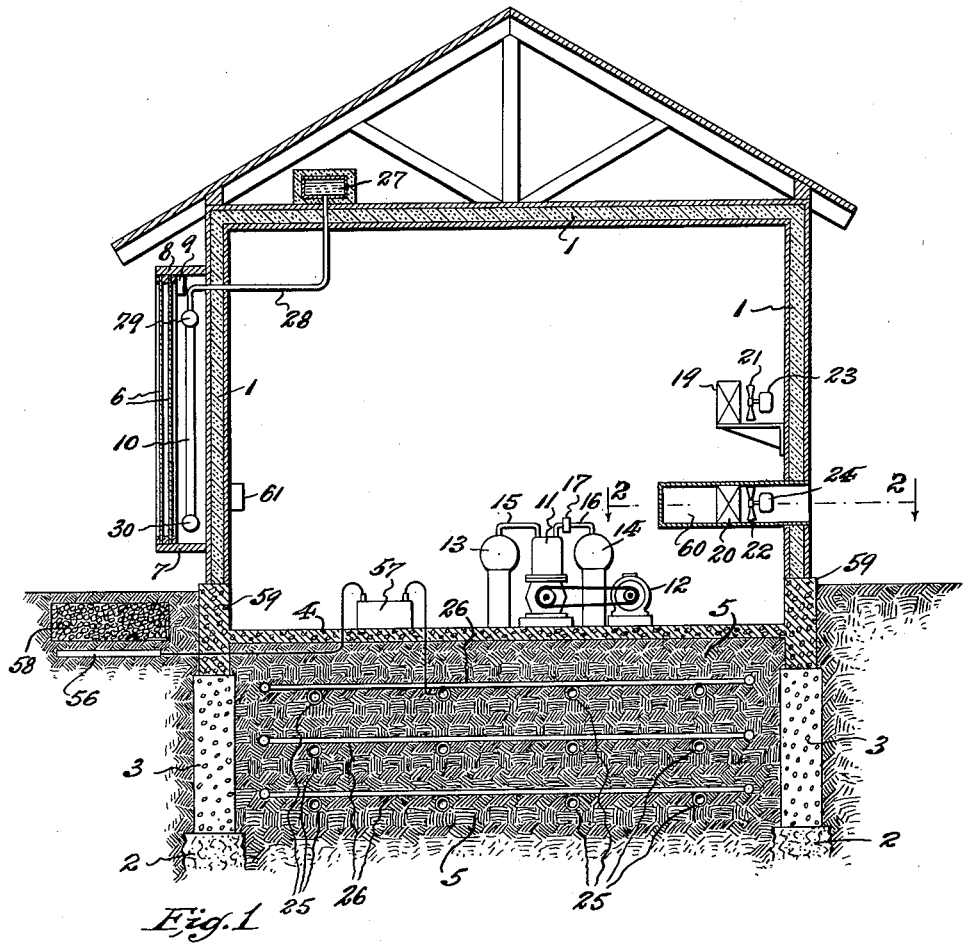
Figure 2:
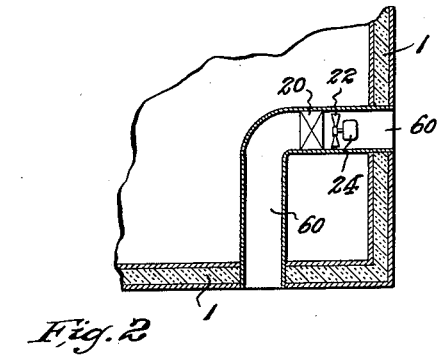
Figure 3:
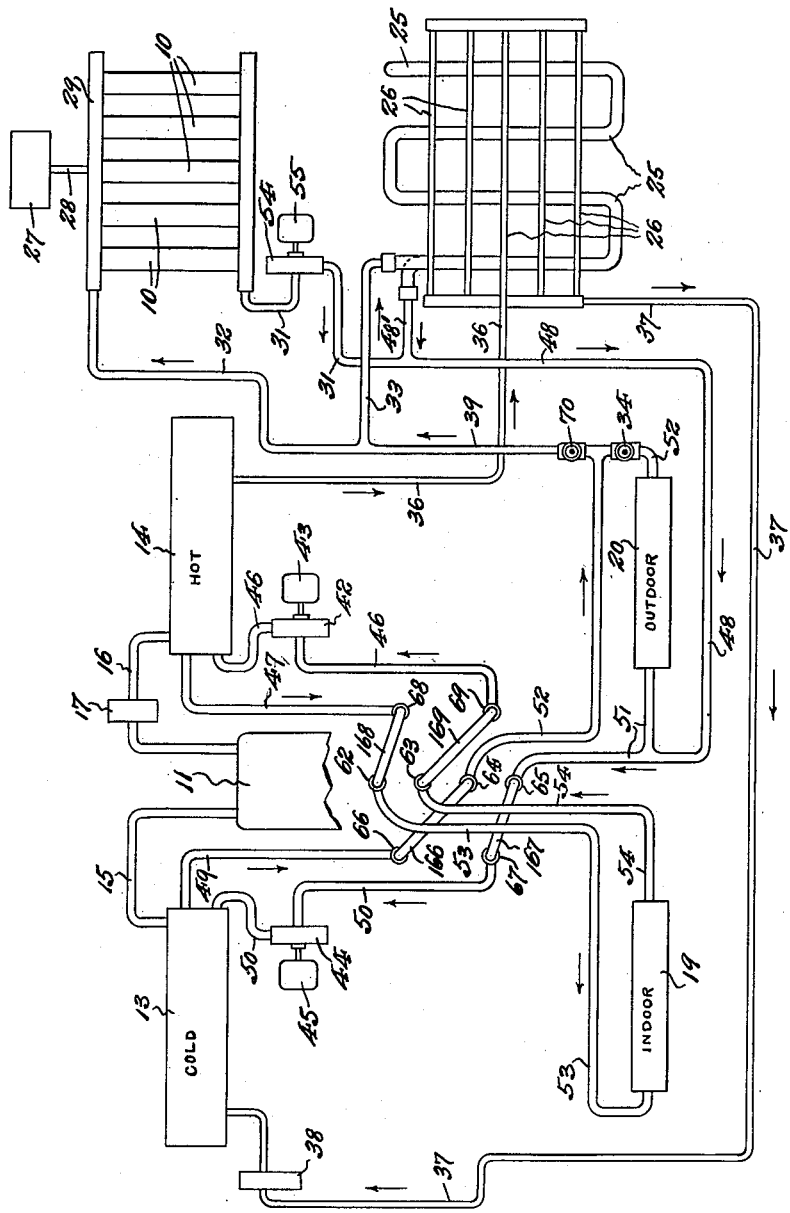

The invention is illustrated by the accompanying drawings, in which:

Fig. 1 is a transverse vertical sectional view showing a house equipped with a heat pump operated heating system according to this invention; Fig. 2 is a fragmentary horizontal section, taken on line 2—2 in Fig. 1; and Fig. 3 is a schematic view showing the components of the heating system and the operative interconnected relation thereof.

Similar characters of reference are employed in the above described views, to indicate corresponding parts.

Referring to the drawings, the reference character 1 indicates the insulated walls and ceiling of a house structure. When building the house, the excavation therefor is made deeper than would ordinarily be customary, and the foundation walls 59 are then supported upon a plurality of piers 3, the latter being, in turn, supported upon suitable footings 2. Beneath the basement floor 4 is a fill of clay or other heat conductive earth 5.

Buried in the fill 5, at suitably spaced apart levels are runs of piping suitably interconnected to provide a labyrinth of pipes 25, through which is circulated a heat transfer liquid, such e. g. as a water-alcohol mixture. The interconnected pipes 25 thus comprise a plurality of layers thereof connected in series, intermediate and surrounding which are masses of clay or other heat conductive earth, by which the fill 5 is comprised. The fill 5 and labyrinth of pipes 25 buried therein provide a heat storage reservoir or stored heat exchanger. To promote maximum thermal conductivity of the clay or earth of which the fill 5 is comprised, a source of D. C. voltage, such e. g. as storage battery 57, is provided. The positive pole of battery 57 is connected to a metallic plate 56 which is buried in the earth exteriorly of the house, and preferably beneath a dry well 58 which receives house roof drainage water. The negative pole of battery 57 is connected to the labyrinth of pipes 25. In operation, this arrangement draws moisture into and through the fill 5 around the pipes 25 by electrical osmosis, thus keeping said fill 5 damp and its thermal conductivity at a maximum.

Suitably located within the house interior is a heat pump comprising a compressor 11, which is driven by an electric motor 12, an evaporator 13 and a condenser 14. The compressor 11 receives a refrigerant gas, such e. g. as freon, from the evaporator 13 through pipe 15, and delivers the same to the condenser 14 through pipe 16, in the line of which is included an oil filter 17. The liquid refrigerant fluid, such as Freon, is returned from the condenser 14 to the evaporator 13 through piping, including an expansion valve 38; the association of this piping with the heat storage means, in accordance with the principles of this invention, being hereinafter more particularly set forth.

An outdoor heat exchanger 20 is mounted in a duct 60, one end of which enters through a house wall from the exterior of the house, and the opposite end returns through a house wall to the house exterior (see Fig. 2), thus permitting outdoor air to pass across said heat exchanger 20.

The outdoor air is driven across the heat exchanger 20 by a fan 22 operated by an electric motor 24.

An indoor heat exchanger 19 is suitably located within the house. Through this indoor heat exchanger 19, indoor air is drawn by a fan 21 operated by an electric motor 23, so that this heat exchanger functions to control the temperature of the house interior.

Heat is delivered to the evaporator 13 and discharged from the condenser 14 by recirculated heat transfer liquid, such e. g. as a water-alcohol mixture. The means for circulating the heat transfer liquid between the heat exchangers 19 and 20, ground storage serving pipes 25 and 15 evaporator 13 and condenser 14, as well as movement of hot condensed refrigerant liquid from the condenser 14 to the evaporator 13 through the ground heat storage means or exchanger, will be best understood by reference to Fig. 3 of the accompanying drawings.

Over the respective layers of heat transfer liquid conducting pipes 25 of the ground heat storage means is laid a system of multiple interconnected layers of tubing 26 which is connected between the condenser 14 and evaporator 13 for return of liquid refrigerant from the former to the latter. Preferably the tubing 26 is of smaller diameter than that of the heat transfer fluid conducting pipes 25, and also of a total length relatively greater than the length of the latter. The relation of the layers of tubing 26 to corresponding layers of heat transfer fluid conducting pipes 25 is such, that the runs of tubing 26 cross the runs of pipe 25 at right angles, and so that the tubing 26 is in contact with said pipes 25 at points of intersection therewith.

In operation of the system, cold heat transfer liquid passes from the evaporator 13 by way of pipe 49 to an exchange connection 66 and interconnecting conduit 166 to exchange connection 64, and thence through the pipe 52 and its normally open valve 34 to the outdoor heat exchanger 20 through which the cold transfer fluid passes. After passing the outdoor heat exchanger, the transfer fluid is discharged through pipe 51, to flow thence through exchange connection 65 to exchange connection 67 by way of interconnecting conduit 167, and thence through pipe 50 and circulating pump 44, driven by electric motor 45, back to the evaporator 13. When thus circulated through the outdoor heat exchanger 20, heat is absorbed by cold transfer fluid from the outdoor air, and the heat thus taken up is transferred by the fluid to the evaporator 13 and given up therein for evaporation of refrigerant fluid in the heat pump operation.

Also in the operation of the system, hot transfer fluid passes from the condenser 14 by way of pipe 47 to exchange connection 68 and thence to exchange connection 62 by way of interconnecting conduit 168, thence through pipe 53 to the indoor heat exchanger 19. The transfer liquid is discharged from the indoor heat exchanger through pipe 54 to exchange connection 63 and thence to exchange connection 69 by way of interconnecting conduit 169. From exchange connection 69, the transfer fluid flows through pipe 46 and circulating pump 42, driven by electric motor 43, back to the condenser 14. When thus circulated through the indoor heat exchanger 19, heat is given up by the transfer fluid and discharged to the house interior for house heating effect.

Communicating with the cold transfer delivery pipe 52, which leads to the outdoor heat exchanger 20, at a point beyond the intake side of the valve 34, is a pipe 39 which includes a normally closed valve 70. Leading from the pipe 39, for connection with the intake end of the labyrinth of pipes 25 of the ground heat storage means or exchanger is an admission pipe 33. From the outlet end of the labyrinth of pipes 25 of the ground heat storage means or exchanger extends a pipe 48' to return pipe 48, which connects with the pipe 51 by which the transfer fluid is returned to the evaporator under the circulating effect of the pump 44 and connected piping hereinabove already described.

Hot refrigerant liquid is discharged from the condenser 14 of the heat pump through pipe 36, and is delivered by the latter to the intake of the runs of tubing 26 which form part of the ground heat storage means or exchanger, whereby said hot refrigerant liquid is caused to flow through the tubing 26, being returned therefrom to the evaporator 13 of the heat pump by pipe 37 and expansion valve 38. The hot refrigerant liquid thus circulated through the tubing 26 gives up part of its heat to the surrounding fill 5 of the ground storage area, whereby to be stored therein.

In moderate winter weather, valve 34 being open and valve 70 being closed, cold transfer fluid is circulated through the outdoor heat exchanger 20, whereby to take up heat from outdoor air for transfer to the heat pump evaporator 13. In extremely cold winter weather, if the outdoor heat exchanger 20 cannot supply from outdoor air enough heat for heat pump operation, or if the outdoor heat exchanger should become frosted up, then valve 34 is closed and valve 70 is opened, whereby to circulate the heat transfer fluid in such manner as to by-pass the outdoor heat exchanger 20, but to flow through the pipes 25 of the ground heat storage means or exchanger. In the latter case heat is taken up by the heat transfer fluid from heat stored in the ground heat storage means or exchanger, and transferred to the evaporator 13 for evaporation of refrigerant fluid in heat pump operation.

It will be apparent that the arrangement of the pipes 25 and tubing 26 of the ground heat storage means or exchanger is subject to considerable variation. In a preferred arrangement thereof, however, it is desirable to cause the hot refrigerant liquid to enter the tubing 26 at a central portion thereof, so that, when partially cooled, it leaves from outlying portions thereof. On the other hand, it is desirable to have the heat transfer fluid enter the pipes 25 at outlying portions thereof and leave the same at the central portion thereof; the flow of refrigerant liquid thus being in counterflow relation to flow of heat transfer fluid. In such arrangement, the cold transfer fluid enters the coolest area of the ground storage means and is discharged from the hottest area of the latter. Since the hot refrigerant liquid conducting tubes 26 cross or intersect the transfer fluid conducting pipes 25 in contact therewith, it will be obvious that there will be a multiplicity of spaced apart points of intersecting contact of the tubing 26 with the pipes 25. The respective layers of intersecting tubing 26 function to transmit heat to the respective layers of pipes 25. Since the tubing 26 directly transmits but a relatively small percentage of the heat carried away by the pipes 25, the liquid in the tubing tends to cool where the tubing directly touches the pipes 25 at a contacting intersection thereof, then the liquid in the tubing warms up as it passes through the tubing to the next point of intersecting contact with the pipes 25, and this effect is repeated throughout the area of the associated tubing 26 and pipes 25. Due to this arrangement and mode of operation, the network of tubing 26 and pipes 25 functions to deliver heat from the ground storage to the heat transfer fluid to which the heat is delivered to the evaporator 13 of the heat pump, when stored heat is depended upon for heat pump operation. When heat pump operating heat is derived from the outdoor heat exchanger 20, then the network of tubing 26, through which hot refrigerant liquid flows, functions to deliver heat to and for storage in the ground storage fill 5.

In the operation of the heating system, the pump driving motor 12, the fan motors 23 and 24, and the pump motors 43 and 45 are all simultaneously started and stopped by control of a house thermostat 61 in accordance with temperature drop and rise within the house.

The operational advantage of the house heating system according to this invention may be illustrated as follows:

A pound of Freon 12 at 30° F. outdoor temperature contains about 81 B. t. u. total heat above base (−40° F.) as a gas. The heat pump will raise the pressure and temperature of this gas to allow condensation at the indoor radiator temperature of, say 130° F. and the total heat will then be about 90 B. t. u., or the heat pump will have added about 9 B. t. u. per pound. This pound of Freon 12 will condense into a liquid containing about 38 at 130° F. 90 less 38 or about 52 B. t. u. will be given up by condensation to heat the house. In the conventional heat pump this pound of Freon would be valved directly into the evaporator and its heat would pass into the cold gas by evaporation. If, however, this pound of hot Freon 12 liquid is run through tubing 26 underground and has its temperature reduced to, say, 60° F. (at which temperature the total heat will be about 21 B. t. u.), then 38 less 21 or about 17 B. t. u. will be given up to and stored in the earth; i. e., 17/52 or the equivalent of about 32 per cent of the total heat pumped into the house will be stored in the earth instead of being dumped back into the evaporator. It is obvious that, in the system of the instant invention, the evaporator must be increased in size about 30% in order to supply the approximate 17 B. t. u. taken out of each pound of Freon 12 during the passage of the hot Freon 12 condensed liquid through the tubing 26 buried in the earth. It is thus obvious that a large part of the heat pumped up to high temperature for indoor use will be salvaged instead of being dumped back into the evaporator for recirculation.

It is also an object of this invention to provide means to supplement the amount of heat derived from heat pump operation, by heat derived from solar energy and added to heat stored in ground heat storage means. To this end, a solar heat trap is built into the south side of the house served by the heating system. This heat trap, in an illustrative form thereof, is provided by an enclosure, the back of which is formed by the house wall, and which is formed by a bottom wall 7, a top wall 8 and side walls extending therebetween. The outer wall or front face of the enclosure is provided by spaced apart glass panels 6. Within enclosure is arranged a plurality of heat transfer fluid conductive pipes 10 which extend between headers 29 and 30. A heat insulated tank 27 is located in the house attic, and communicates with the pipe 10 through interconnecting service pipe 28, thus serving to maintain the system of pipes 10 full of heat transfer fluid at all times. The system of pipes 10, as exposed to solar rays, is operative to absorb solar heat into the transfer fluid circulated therein.

Heat transfer fluid is circulated between solar heat trap pipes 10 and pipes 25 of the ground heat storage means during sunshiny weather, whereby to deliver heat derived from solar energy to ground storage. To this end, heat transfer fluid is delivered from the pipes 10 to the pipes 25 by pump 54, operated by electric motor 55, through conduit 31 to pipe 48', returning to pipes 10 by way of pipe 33 and pipe 32 to said pipes 10. The operation of electric motor 55 may be controlled by a thermostat 9, whereby to put said supplementary heat supplying means in operation during hours of sunshine. It will be apparent that through the described agency and by the circulation of heat transfer fluid therethrough, heat derived from solar energy can be delivered to the ground heat storage means to supplement the supply of heat stored in the latter subject to use in furnishing heat for heat pump operation in extremely cold winter weather.

Having now described my invention, I claim:

1. A house heating system comprising a heat pump including a refrigerant fluid evaporator and a refrigerant fluid condenser, means for storing heat in the ground beneath the house comprising a labyrinth of pipes buried in said ground through which heat transfer fluid can be caused to flow and another labyrinth of tubes, buried in the ground with said pipes, through which hot refrigerant liquid is caused to pass from the condenser to the evaporator, an outdoor heat exchanger, an indoor heat exchanger, means for circulating heat transfer fluid between the condenser and the indoor heat exchanger, means to circulate heat transfer fluid between the outdoor heat exchanger and the evaporator, and means to circulate heat transfer fluid at will between the ground heat storage means and the evaporator in by-passing relation to the outdoor heat exchanger.

2. A house heating system as defined in claim 1 wherein the hot refrigerant conducting tubes of the ground heat storage means are of smaller cross-section than the cross-section of the heat transfer fluid conducting pipes with which they are associated, with said tubes arranged to run substantially at right angles to the pipes and in contact with the latter at points of intersection therewith.

3. A house heating system as defined in claim 1 wherein the hot refrigerant conducting tubes of the ground heat storage means are of smaller cross-section than the cross-section of the heat transfer fluid conducting pipes with which they are associated, with said tubes arranged to run substantially at right angles to the pipes and in contact with the latter at points of intersection therewith, and the total length of said tubes being substantially in excess of the total length of said pipes.

4. A house heating system as defined in claim 1 including a source of direct current voltage, a conductive plate buried in a wet location adjacent the house, an electrical connection between the positive pole of said voltage source and said plate, and an electrical connection between the negative pole of said voltage source and the labyrinth of pipes of the ground heat storage means, whereby moisture is caused to pass by electrical osmosis from the wet location to the earth around said labyrinth of pipes, thereby to dampen said earth and thus increase its thermal conductivity.

5. A house heating system as defined in claim 1 including a solar heat trap through which heat transfer fluid can be circulated, and means to circulate heat transfer fluid between said solar heat trap and the buried heat transfer fluid conducting pipes of the ground heat storage means.

6. A house heating system comprising a heat pump including a refrigerant fluid evaporator and a refrigerant fluid condenser, a labyrinth of pipes buried in the ground and adapted to transmit heat to said ground for storage, means adapted to pass the hot condensed liquid refrigerant through said labyrinth of pipes on its way from the hot condenser to the cool evaporator whereby a portion of the heat in said hot condensed liquid refrigerant passes into the ground for storage and means adapted in extremely cold weather to extract stored heat from said ground by way of said labyrinth of pipes and supply said extracted heat to the evaporator of said heat pump.

7. A house heating system comprising a heat pump including a refrigerant fluid evaporator and a refrigerant fluid condenser, a labyrinth of pipes buried in the ground under said house, whereby they are near the surface yet protected from the rigors of winter and are adapted to transmit heat to said ground for storage and to extract said stored heat from said ground, means adapted to pass the hot condensed liquid refrigerant through said labyrinth of pipes on its way from the hot condenser to the cool evaporator whereby a portion of the heat in said hot condensed liquid refrigerant passes into the ground for storage, and means adapted in extremely cold weather to extract stored heat from said ground by way of said labyrinth of pipes and supply said extracted heat to the evaporator of said heat pump.

8. A house heating system as defined in claim 1 wherein the hot refrigerant conducting tubes of the ground heat storage means are of smaller cross-section than the cross-section of the heat transfer fluid conducting pipes, said tubes being disposed to run substantially at right angles to the pipes and in close proximity to the latter at points of intersection therewith, and the total length of said tubes being substantially in excess of the total length of said pipes, said house heating system further including a solar heat trap through which heat transfer fluid can be circulated, and means to circulate heat transfer fluid between said solar heat trap and the buried heat transfer fluid conducting pipes of the ground storage means.

9. A house heating system as defined in claim 1 including a source of direct current voltage, a conductive plate buried in a wet location adjacent the house, an electrical connection between the positive pole of said voltage source and said plate, and an electrical connection between the negative pole of said voltage source and the labyrinth of pipes of the ground heat storage means, whereby moisture is caused to pass by electrical osmosis from the wet location to the earth around said labyrinth of pipes, thereby to dampen said earth and thus increase its thermal conductivity, said house heating system further including a solar heat trap through which heat transfer fluid can be circulated, and means to circulate heat transfer fluid between said solar heat trap and the buried heat transfer fluid conducting pipes of the ground heat storage means.

10. A house heating system comprising a heat pump including a refrigerant fluid evaporator and a refrigerant fluid condenser, means for storing heat in the ground beneath the house comprising a labyrinth of pipes buried in said ground through which heat transfer fluid is caused to flow and another labyrinth of tubes buried in the ground with said pipes through which refrigerant fluid is caused to flow, connections from said condenser arranged to deliver hot refrigerant fluid to the central and hottest part of the tube labyrinth and other connections arranged to discharge cooled refrigerant fluid from outlying portions of said tube labyrinth for return to said condenser, connections arranged to discharge hot heat transfer fluid from the central and hottest part of the pipe labyrinth to said evaporator and other connections from the evaporator arranged to deliver relatively cool heat transfer fluid back to outlying and cooler parts of the pipe labyrinth, all whereby inner portions of said heat storage means are maintained at relatively high temperature and outer portions of said heat storage means are maintained at low temperature so that heat flows from relatively warm surrounding earth toward the heat storage means.

11. A house heating system as defined in claim 10 including a solar heat trap through which heat transfer fluid can be circulated, and connections arranged to pass the heat transfer fluid from said solar heat trap to the hotter part of the laybrinth of pipes of the ground heat storage means and back to the solar heat trap from the cooler part of the latter.

FRAZER W. GAY.

REFERENCES CITED

The following references are of record in the file of this patent:

UNITED STATES PATENTS

| Number | Name | Date |
| --- | --- | --- |
| 1,683,434 | Altenkirch | Sept. 4, 1928 |
| 1,874,803 | Reed | Aug. 30, 1932 |
| 1,969,187 | Schutt | Aug. 7, 1934 |
| 2,283,206 | Wayward | May 19, 1942 |
| 2,396,338 | Newton | Mar. 12, 1946 |
| 2,428,876 | Hawkins | Oct. 14, 1942 |
| 2,513,373 | Sporn | July 4, 1950 |